(12) United States Patent
Takenaka et al.

(10) Patent No.: US 8,240,407 B2
(45) Date of Patent: Aug. 14, 2012

(54) OMNI-DIRECTIONAL VEHICLE

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Shinichiro Kobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 497 days.

(21) Appl. No.: 12/599,223

(22) PCT Filed: May 16, 2008

(86) PCT No.: PCT/JP2008/001236
§ 371 (c)(1),
(2), (4) Date: Dec. 14, 2009

(87) PCT Pub. No.: WO2008/139740
PCT Pub. Date: Nov. 20, 2008

(65) Prior Publication Data
US 2011/0209932 A1    Sep. 1, 2011

(30) Foreign Application Priority Data
May 16, 2007   (JP) .................... 2007-130864

(51) Int. Cl.
*B60B 19/12*   (2006.01)
*B62H 1/12*    (2006.01)
(52) U.S. Cl. ........... 180/7.1; 180/10; 180/210; 180/220; 280/293; 301/5.1; 301/5.23

(58) Field of Classification Search ............... 180/7.1, 180/10, 21, 209, 210, 218, 219, 220; 280/293, 280/304; 301/5.1, 5.23
See application file for complete search history.

(56) References Cited

U.S. PATENT DOCUMENTS

| | | | | |
|---|---|---|---|---|
| 880,823 | A * | 3/1908 | Redfield | 180/6.2 |
| 1,928,412 | A * | 9/1933 | Deninson | 180/21 |
| 2,372,043 | A * | 3/1945 | Elie | 180/6.44 |
| 2,950,127 | A * | 8/1960 | Phillips | 280/304 |
| 3,437,351 | A * | 4/1969 | Newbern | 280/205 |
| 3,465,843 | A | 9/1969 | Guinot | |
| 4,413,693 | A * | 11/1983 | Derby | 180/343 |
| 4,715,460 | A * | 12/1987 | Smith | 180/7.1 |
| 4,927,401 | A * | 5/1990 | Sonesson | 446/456 |
| D309,254 | S * | 7/1990 | Guile | D8/375 |
| 5,213,176 | A * | 5/1993 | Oroku et al. | 180/168 |
| 7,747,349 | B2 * | 6/2010 | Yeh et al. | 700/245 |
| 7,878,284 | B1 * | 2/2011 | Shultz | 180/199 |
| 8,162,092 | B2 * | 4/2012 | Takenaka et al. | 180/222 |
| 2002/0112899 | A1 * | 8/2002 | Dijksman et al. | 180/7.1 |

(Continued)

FOREIGN PATENT DOCUMENTS
JP    46-029331 B1    8/1971
(Continued)

*Primary Examiner* — Paul N Dickson
*Assistant Examiner* — Wesley Potter
(74) *Attorney, Agent, or Firm* — Carrier Blackmann & Associates, P.C.; Joseph P. Carrier; William D. Blackman

(57) ABSTRACT

Provided is a vehicle that can make tight turns without significantly changing an attitude of a rider, and is highly convenient in narrow places. A omni-directional one-wheeled vehicle comprises a vehicle body (7) and a secondary wheel (35) configured to contact a ground surface at a point displaced from a contact point of a driven road wheel (2).

15 Claims, 14 Drawing Sheets

U.S. PATENT DOCUMENTS

| | | | |
|---|---|---|---|
| 2006/0131830 A1* | 6/2006 | Berg | 280/205 |
| 2010/0096905 A1* | 4/2010 | Takenaka et al. | 301/5.23 |
| 2010/0139996 A1* | 6/2010 | Takenaka et al. | 180/20 |
| 2011/0067936 A1* | 3/2011 | Takenaka et al. | 180/21 |
| 2011/0067937 A1* | 3/2011 | Gomi et al. | 180/21 |
| 2011/0067938 A1* | 3/2011 | Gomi et al. | 180/21 |
| 2011/0067939 A1* | 3/2011 | Takenaka | 180/21 |
| 2011/0067940 A1* | 3/2011 | Takenaka | 180/218 |

FOREIGN PATENT DOCUMENTS

| | | | |
|---|---|---|---|
| JP | 59102663 A | * | 6/1984 |
| JP | 63031804 A | * | 2/1988 |
| JP | 63149270 A | * | 6/1988 |
| JP | 2004-129435 A | | 4/2004 |
| JP | 2004-306782 A | | 4/2004 |
| JP | 2004-243845 A | | 9/2004 |
| JP | 2005-067334 A | | 3/2005 |
| JP | 2006-008013 A | | 1/2006 |

* cited by examiner

OMNI-DIRECTIONAL VEHICLE

TECHNICAL FIELD

The present invention relates to a vehicle on which a person can ride, and in particular to a one-wheeled omni-directional motor vehicle.

BACKGROUND OF THE INVENTION

A vehicle including a chassis for supporting a rider and a wheel provided centrally on the chassis is known (See Patent Document 1). Also is known a vehicle including a pair of wheels disposed one next to the other and a step platform provided between the two wheels or on either outer side of the two wheels (See Patent Document 2) for placing the feet of a rider thereon.
Patent Document 1:
 Japanese patent laid open publication No. 2004-129435 (FIGS. 39 to 42) Patent Document 2:
 Japanese patent laid open publication No. 2006-008013 (FIGS. 31 to 34)

BRIEF SUMMARY OF THE INVENTION

Task to be Achieved by the Invention

The vehicle disclosed in Patent Document 1 is enabled to make a turn by tilting an axle of the wheel, and thereby changing the effective radius of the contact surface of a sidewall of the wheel. Therefore, a certain turning radius is required when making a turn, and a sharp turn is not possible. This may impose some limit as to the useful applications of the vehicle. Also, because of the need to tilt the axle, the surface supporting the rider inevitably tilts when making a turn, and this necessitates the rider to adjust his or her posture to the tilting of the supporting surface.

The vehicle disclosed in Patent Document 2 is enabled to make a turn substantially on the spot by individually controlling the rotational speeds and/or rotational directions of the two wheels. However, because the two wheels are required to be placed in parallel to each other, the lateral dimension of the vehicle is so large that the vehicle may not be useable in narrow places.

In view of such problems of the prior art, a primary object of the present invention is to provide a vehicle that is capable of making sharp turns without requiring the posture of a rider to be significantly changed, and can be conveniently used in narrow places.

Means for Achieving the Task

The present invention provides a vehicle, comprising a vehicle body; an annular driven road wheel having a circular cross section and adapted to engage a road or floor surface at a ground contact point; a drive assembly for driving the driven road wheel; and a ground contact member provided on the vehicle body and configured to contact the road or floor surface; wherein the driven road wheel is rotatable around a central axial line (B) thereof and around an annular cross sectional center line (C) passing through a center of the circular cross section thereof in such a manner that the vehicle is enabled to travel in a fore-and-aft direction as the driven road wheel is driven around the central axial line (B) thereof and in a lateral direction as the driven road wheel is driven around the annular cross sectional center line (C). The annular driven road wheel may consist of a flexible endless annular tube, or an assembly of an endless annular member and a plurality of discrete rollers supported by the endless annular member so as to be rotatable around a circumferential line or tangential lines.

The vehicle according to the present invention preferably further comprises a mechanism for selectively moving the ground contact member between a ground contacting position and ground non-contacting position. The ground contact member is preferably provided rear to the driven road wheel or, alternatively, on each side of the driven road wheel.

The ground contact member may consist of a non-rotatable member, but may also be a secondary wheel rotatable around a rotation axis parallel to the central axial line of the driven road wheel. In particular, the ground contact member may consist of a secondary wheel which is power actuated in a lateral direction and can roll freely in a fore-and-aft direction. Alternatively, the ground contact member may consist of a secondary wheel which is rotatable around both a horizontal axis and a vertical axis. In such a case, the secondary wheel may be resiliently urged by a biasing means in such a manner that the horizontal central axial line is in parallel with the central axial line (B) of the driven road wheel.

Effect of the Invention

According to such a structure of the present invention, the ground contact member contributes to the maintenance of an upright orientation of the vehicle. Furthermore, when the ground contact member consists of a non-rotatable member or a secondary wheel which is enabled to restrict the direction of the movement of the vehicle, it is possible to turn the vehicle body by causing the driven road wheel to turn around the center of the circular cross section thereof, causing the vehicle body to move sideways, while the ground contact member is brought into contact with the ground. Therefore, the vehicle is enabled not only to move horizontally in the fore-and-aft direction but to make a turn. In particular, the vehicle is enabled to make a turn of a desired turning radius which is determined by the distance between the ground contact point of the driven road wheel and ground contact point of the ground contact member. Thus, the vehicle can make a sharp turn without causing any significant change to the posture of the rider, and can favorably maneuver in narrow places in a convenient manner.

According to a preferred embodiment of the present invention, the drive assembly comprises a pair of rotary members disposed on the vehicle body one next to the other in a mutually axially spaced relationship and rotatable around a common central axial line (A), a pair of drive units for individually actuating the rotary members, respectively, a plurality of free roller provided along a circumference of each rotary member, wherein the driven road wheel is axially interposed between and supported by the free rollers of the two rotary members so as to be rotatable around a same central axial line (B) as the central axial line (A) of the rotary members, and each free roller is supported so as to be rotatable around a central axial line or rotation axis (D) related to the central axial line (B) of the driven road wheel as skew lines and engage an outer surface of the driven road wheel.

According to this embodiment, the driven road wheel is interposed between the rotary members via the free rollers so that the rolling contact between the driven road wheel and free rollers is ensured, and the overall structure is simplified.

According to another embodiment of the present invention, the drive assembly comprises a rotary member disposed so as to be rotatable around the same central axial line (A) as the annular member, a drive unit for rotatively actuating the rotary member, and a plurality of free rollers mounted on a periphery of the rotary member, wherein the driven road wheel is disposed opposite to the rotary member and engaged by the free rollers of the rotary member axially from one side thereof, and each free roller is supported so as to be rotatable around a rotation axis (D) related to the central axial line (B) of the driven road wheel as skew lines and engage an outer surface of the driven road wheel.

According to this embodiment, the drive assembly is required to have only one rotary member, and the number of component parts is reduced.

According to yet another embodiment of the present invention, the ground contact member comprises a pair of secondary wheels which are configured to engage points of a ground surface laterally spaced from the driven road wheel and are provided with a central axial line extending in parallel to that of the driven road wheel, each secondary wheel being provided with an individually operable braking unit. Braking one of the secondary wheels causes a yaw moment to be applied to the vehicle, and allows the vehicle to make a turn in a desired direction. If the ground contact member consists of a secondary wheel that can be actuated sideways and roll freely in a fore-and-aft direction, the vehicle can not only travel freely in the fore-and-aft direction but also to freely make a turn without regard to if the vehicle is traveling or stationary. Therefore, the vehicle is enabled to make highly sharp turns. If an arm supporting the secondary wheel is configured to be resiliently tilted so that the braking force may be adjusted in dependence on the tiling angle of the arm, a highly maneuverable omni-directional vehicle can be provided.

DETAILED DESCRIPTION OF THE PREFERRED EMBODIMENT(S)

A preferred embodiment of the vehicle of the present invention is described in the following with reference to FIGS. 1 to 7.

The vehicle of the illustrated embodiment is provided with a yoke-shaped vehicle body 7 and a driven road wheel 2 supported by the vehicle body 7.

The vehicle body 7 comprises a right leg member 7R and a left leg member 7L connected to the right leg member 7R via a hinge having a hinge pin 71. The right leg member 7R is fitted with a horizontally extending right step 32R, and the left leg member 7L is fitted with a horizontally extending left step 32L. To the right leg member 7R is fixedly connected a lower end of a pole 33. The pole 33 extends vertically from the vehicle body 7, and is provided with a horizontal handle bar 34 at an upper end thereof. The vehicle body 7 of the vehicle 1 is thus an integral assembly of the right and left steps 32R and 32L, pole 33 and handle bar 34.

To the vehicle body 7 is attached a secondary wheel 35 via an arm 36. The secondary wheel 35 and arm 36 are described in greater detail hereinafter.

A driven road wheel 2 and a drive mechanism therefor are described in the following primarily with reference to FIGS. 3 to 7.

The right leg member 7R rotatably supports a right rotary member 4R via a support shaft 6R. The left leg member 7L rotatably supports a left rotary member 4L via a support shaft 6L. Thereby, the two rotary members 6R and 6L are axially (or laterally) spaced from each other, and are supported by the vehicle body 7 so as to be rotatable around a same rotation axis or central axial line (A).

Each rotary member 4R, 4L is integrally formed with a pulley (or sprocket) 9R, 9L. The vehicle body 7 is provided with a pair of electric motors 5R and 5L. One of the electric motors 5R is drivingly connected to the corresponding pulley 9R via a belt (or link chain) 10R, and the other electric motor 5L is drivingly connected to the corresponding pulley 9L via a belt (or link chain) 10L.

The vehicle body 7 supports a rechargeable battery power source for supplying electric power to the electric motors 5R and 5L.

Each rotary member 4R, 4L is formed with a frustoconical tapered outer circumferential surface 41R, 41L opposing the counterpart of the other rotary member. The tapered outer circumferential surface 41R of the right rotary member 4R is provided with a plurality (eight, for instance) of free rollers 3R at a regular interval along the circumference thereof each via a bracket 42R. The tapered outer circumferential surface 41L of the left rotary member 4L is provided with a plurality (eight, for instance) of free rollers 3L at a regular interval along the circumference thereof each via a bracket 42L.

The driven road wheel 2 is formed as an annular member made of resilient rubber-like material such as rubber for tires, rubbers and elastomeric plastic materials, and is given with a circular cross section which is either solid or hollow. The driven road wheel 2 is configured to rotate around the center of the cross section (cross sectional center) (C) thereof. The cross section may be broadly called as circular even when grid or other grooves are formed on the surface of the driven road wheel 2.

When the outer surface of the driven road wheel 2 is formed with grid grooves, the cross sectional shape (outer profile) is not precisely circular. However, the driven road wheel 2 may be considered as having a circular cross section even when grid grooves are formed on the outer surface thereof as long as the driven road wheel 2 is capable of rotating around the center of the cross section (C).

The driven road wheel 2 is located between the two rotary members 4R and 4L, and is interposed between the free rollers 3R and 3L of the two rotary members 4R and 4L with respect to the common central axial line (axis of symmetry) from either side so as to be rotatable around a central axial line (B) (axis of symmetry) coinciding with the common central axial line (A) of the two rotary members 4R and 4L.

A compression coil spring 8 is interposed between the right leg member 7R and left leg member 7L of the vehicle body 7. The compression coil spring 8 provides a biasing force that urges the right leg member 7R and left leg member 7L of the vehicle body 7 toward each other. Thereby, the free rollers 3R and 3L are urged against the outer circumferential surfaces of the driven road wheel 2 so that the free rollers 3R and 3L frictionally engage the outer circumferential surface of the driven road wheel 2 in a torque transmitting relationship.

Each free roller 3R, 3L is supported so as to be rotatable around a rotation axis (D) which is neither perpendicular nor parallel to the central axial line (B) of the driven road wheel 2 (or the central axial line (A) of the rotary members 4R and 4L) or, more accurately, so as to be rotatable in a tangential direction of a point contact with a circle centered around the central axial line (B). In other words, the free rollers 3R and 3L are inclined with respect to the rotational direction of the driven road wheel 2 around the rotation center (B) thereof.

This is explained in greater detail with reference to FIGS. 6 and 7. The rotation axis (D) of each free roller 3R, 3L is tilted at least with respect to the corresponding radial direction R of the driven road wheel 2 by a certain angle ($\alpha$ in FIG. 6) as seen from the direction of the symmetry axis of the driven road wheel 2, and, at the same time, is tilted with respect to the cross sectional center line of the driven road wheel 2 by a certain angle ($\beta 1$, $\beta 2$ in FIG. 7) as seen radially from an inner part of the driven road wheel 2. Such a three dimensional tilting may be comparable to the tooth configuration of helical bevel gears defining conical surfaces of prescribed cone angles. The cross sectional center line of the driven road wheel 2 as used herein means a center line defined by the center of the circular cross section of the driven road wheel 2, and is concentric to the rotation center of the main wheel (driven road wheel). The cross sectional center line of the driven road wheel 2 is simply called as the cross sectional center line (C) hereinafter.

The tilting angle α may be any angle other than zero or 90 degrees, and neither of the tiling angles β1 and β2 is 90 degrees.

By thus three dimensionally tilting the rotation axis (D) of each free roller 3R, 3L with respect to an imaginary vertical plane perpendicular to the horizontal rotation center (A=B), the frictional force acting between the outer circumferential surface of each free roller 3L, 3R and the outer surface of the driven road wheel 2 includes a component directed tangentially to the driven road wheel 2 (around the central axial line A=B) and a component directed around the cross sectional center line (C). The free rollers of only one set of the two sets of free rollers are required to be three dimensionally tilted as discussed above while the free rollers of the other set may be parallel to the rotational direction of the driven road wheel 2.

The contact surfaces of the free rollers 3R and 3L and driven road wheel 2 may be formed with suitable irregular patterns or roughened so that the frictional force may be maximized.

When the two rotary members 4R and 4L are turned in a same direction at a same speed by the electric motors 5R and 5L, respectively, this rotational force is frictionally transmitted to the driven road wheel 2 via the free rollers 3R and 3L provided on the rotary members 4R and 4L. Because the rotation axis (D) of each free roller 3R, 3L is tilted as discussed above, and the free rollers 3R and 3L are arranged symmetrically with respect to the driven road wheel 2, when the two rotary members 4R and 4L are turned in a same direction at a same speed, the frictional force acting between the contact points between the free rollers 3R, 3L and driven road wheel 2 are exclusively directed circumferentially (tangentially) of the driven road wheel 2 or around the central axial line (B) thereof. Thereby, an actuating force centered around the central axial line (B) acts upon the road contact surface of the driven road wheel 2, and this causes the vehicle body 7 and, hence, the vehicle 1 itself to travel in a fore-and-aft direction.

As shown in the diagram of FIG. 8, as the outer circumferential surface of a rod B having a circular cross section and rotatable around a central axial line Cb thereof is engaged by a free roller F whose central axial line Cf is slanted with respect to the rod B, and the free roller F is moved along the central axial line Cb of the rod B, owing to the component f of the frictional force acting between the free roller F and rod B at the point of contact between them, the rod B is subjected to a rotational drive force that turns the rod B around the central axial line Cb thereof.

This working principle is described in more detail with reference to the illustrated omni-directional drive device 1. When the two rotary members 4R and 4L are turned in different directions and/or at different speeds by using the electric motors 5R and 5L, in addition to the circumferential (tangential) force owing to the rotations of the two rotary members 4R and 4L, a component of force perpendicular to this circumferential force acts upon the contact surface of each free roller 3R, 3L with the driven road wheel 2. This component of force applies a rotational drive force that twists the outer surface of the driven road wheel 2 around the cross sectional center line (C) of the driven road wheel 2, and this in turn causes the driven road wheel 2 to turn around the cross sectional center line (C) thereof.

The rotation of the driven road wheel 2 around the cross sectional center line (C) thereof depends on the rotational speed difference between the two rotary members 4R and 4L. For instance, when the rotary members 4R and 4L are turned in mutually opposite directions at a same speed, the driven road wheel 2 does not rotate around the central axial line B (symmetrical axial line) thereof, but rotates around the cross sectional center line (C). Thereby, the driven road wheel 2 receives a lateral drive force or a drive force of the same direction as the central axial line (B) of the driven road wheel 2, and the vehicle body 7 and, hence, the vehicle 1 itself travels laterally or sideways.

By thus individually controlling the rotational speeds and directions of the rotary members 4R and 4L by using the electric motors 5R and 5L, the driven road wheel 2 is enabled to move in any desired direction on a plane.

The secondary wheel 35 is described in the following with reference to FIGS. 1 and 2. An upper end of the arm 36 is pivotally attached to a bracket 361 secured to a rear surface of the vehicle body 7 via a horizontal pivot shaft 362 so that the arm 36 may be tilted upward around the upper end thereof. A free end (lower end) of the arm 36 is provided with a yoke member 351.

The secondary wheel 35 is provided to a rear part of the driven road wheel 2 in the fore-and-aft direction, and is rotatably supported by the yoke member 351 via a horizontal shaft 352 so as to be rotatable around a horizontal central axial line. The fore-and-aft direction of the driven road wheel 2 as used herein means a direction perpendicular to the central axial line (B) of the driven road wheel 2 and the driven road wheel 2 is enabled to travel in the fore-and-aft direction. The secondary wheel 35 may be unable to rotate around a vertical axial line, or may also be configured to be rotatable around a vertical axial line along with the yoke member 351, optionally given with a certain caster angle. When the secondary wheel 35 is unable to rotate around a vertical axial line, the secondary wheel 35 is configured in such a manner that the central axial line (pivot shaft 362) is in parallel with the central axial line (B) of the driven road wheel 2.

The part of the pivotal connection between the arm 36 and vehicle body 7 (the part of the pivot shaft 362) is fitted with a torsion coil spring 363 that urges the arm 36 downward. Thereby, the secondary wheel 35 engages the ground with a prescribed ground contact load.

The handle bar 34 is provided with a grip lever 37 which is connected to the free end of the arm 36 via a per se known Bowden cable so that the arm 36 may be tilted upward against the spring force of the torsion coil spring 363 and the secondary wheel 35 may be lifted off the ground by gripping the grip lever 37. The secondary wheel 35 can thus be selectively grounded and raised as required by operating the grip lever 37. The lowering and raising of the arm 36 can be effected not only manually by using a grip lever or the like or but also electrically by using an electromagnetic actuator or the like.

The vehicle 1 of the illustrated embodiment is used by a rider placing the rider's feet on the right and left steps 32R and 32L and gripping the handle bars 34 while the driven road wheel 2 engages the ground surface.

The driven road wheel 2 is able to move the vehicle body both laterally and longitudinally as a translational movement owing to the rotation of the driven road wheel around the central axial line (B) thereof and the rotation around the cross sectional center line (C) of the circular cross section, but is unable to turn around a vertical axial line or undergo a yaw movement by itself. However, when the driven road wheel 2 is turned around the cross sectional center line (C) with the secondary wheel 35 engaging the ground, the lateral side force of the secondary wheel 2 engaging the ground surface restricts the moving direction of the vehicle 1 in such a manner that a yaw moment around a yaw axis (vertical axis) acts upon the driven road wheel 2, and the vehicle body 7 (vehicle 1) is enabled to turn. In other words, by creating a frictional force in a direction that does not coincide with the line connecting the ground contact point of the driven road wheel 2 and the ground contact point of the secondary wheel 35 by using the secondary wheel 35, a moment around a yaw axis can be produced. Thereby, the vehicle body 7 is enabled to make a turn of a relatively small turning radius.

Instead of using a secondary wheel, the free end 36a of the arm 36 may be pointed or otherwise sharpened as a tip of a walking stick as illustrated in the broken line circle in FIG. 2 so that the lateral and longitudinal movements may be restrained. According to this arrangement, when the driven road wheel 2 is rotated around the cross sectional center line (C) by using the electric motors 5R and 5L with the tip 36a engaging the ground, the vehicle body 7 is enabled to turn at a turning radius given by the distance between the ground contact point of the free end 36a and the ground contact point of the driven road wheel 2. Thereby, the vehicle 1 can make sharp turns without the rider being required to change his or her posture so that the rider can conveniently maneuver the vehicle in narrow places.

In any case, by combining the rotative actuation around the cross sectional center (C) of the circular cross section of the driven road wheel 2 with the rotative actuation around the central axial line (B) of the driven road wheel 2, and selectively engaging the secondary wheel 35 or the free end 36a of the arm 36 with the ground, the vehicle can move in any desired direction and turn in any desired direction on a road surface or a floor surface.

When a traveling mode other than straight forward, straight rearward, lateral, oblique and revolution on the spot is desired, the secondary wheel 35 may be lifted from the ground as indicated by the imaginary lines in FIG. 1 by gripping the grip lever 37. Thereby, the secondary wheel 35 is prevented from applying a resistance to the movement of the vehicle 1, and a favorable one wheeled traveling mode can be achieved.

When the secondary wheel 35 is given with a caster angle, the secondary wheel 35 may be placed on the ground even when the vehicle is traveling straight ahead or straight rearward because the caster angle helps the vehicle 1 to travel straight ahead in a stable manner.

As shown in FIG. 9, when the secondary wheel 35 is rotatable around a vertical axial line via the vertical shaft 353, it is possible to have a torsion coil spring 354 serving as a basing means produce a resilient force to urge the secondary wheel 35 so that the rotation axis (D) of the secondary wheel 35 is parallel to the central axial line (B) of the driven road wheel 2.

According to this structure, the vehicle is enabled to travel straight ahead in a stable manner without an undesired tendency to travel in an oblique direction when the secondary wheel engages the ground.

The ground contact member is not limited to a rotatable member such as the secondary wheel 35, but may also be other non-rotatable members such as a ball. In such a case, the arm 36 is kept raised when the vehicle is not making a turn, and the ground contact member is brought into engagement with the ground only when the travel direction of the vehicle is desired to be changed by turning.

FIGS. 10A and 10B show yet another modified embodiment of the vehicle 1 of the present invention. In the vehicle 1 of the illustrated embodiment, a motor 355 is attached to the lower end of the arm 36. An output shaft 356 of the motor 355 supports a pair of rings 357 and 358 of a same diameter in a coaxial relationship each via four spokes 359. The spokes 359 of each ring 357, 358 are spaced apart from each other by 90 degrees, and the spokes 359 of the two ring 357, 358 are offset to each other by 45 degrees. The parts of each ring located between the spokes each support a barrel shaped free roller 360, made of polymer material, for instance, so as to be rotatable around the circumferential direction of the ring or around the corresponding tangential direction of the ring. Therefore, when the motor 355 is activated, this assembly serving as a ground contact member allows the vehicle 1 to turn around the ground contact point of the driven road wheel 2. Also, without regards to if the motor 355 is activated not, whenever the driven road wheel 2 is actuated, owing to the action of the free rollers 360, the ground contact member is allowed to freely follow the movement of the vehicle 1. According to this embodiment, by selectively activating the electric motor 355, the vehicle 1 can be steered, and make sharp turns. The contact wheel assembly is an example of omni-directional-wheels that can travel in the X and Y directions, and other forms of omni-directional-wheels may also be applied to the present invention. Similar as with the previous embodiments, the ground contact member assembly may be configured such as to be tilted upward and raised off the ground when desired.

FIGS. 11 and 12 show another embodiment of the vehicle 1 of the present invention. The driven road wheel 2 of the vehicle 1 of the illustrated embodiment comprises an annular shaft member 22 and a plurality of outer sleeves 25 which are each supported by the annular shaft member 22 so as to be rotatable around the corresponding tangential line of the annular shaft member 22 and engage an object to be actuated.

More specifically, a plurality of inner sleeves 23 are fitted on the annular shaft member 22 so as to be immobile circumferentially and rotationally. On each inner sleeve 23 is fitted an outer sleeve 25 integrally fitted with a metal bearing 24 in a freely rotatable manner. The outer sleeves 25 are free rollers that engage an object to be actuated, and are fitted on the annular shaft member 22 like so many beads of a rosary. Each outer sleeve 25 is rotatable around the corresponding tangential line or around a line corresponding to the cross sectional center line (C). The numbers of the outer sleeves 25 and free rollers 3R and 3L are selected so that the outer sleeve 25 engaging the ground is engaged by at least one of the free rollers 3R and at least one of the free rollers 3L, and is rotatively actuated at all times without rotating idly.

The cross sectional center line of the driven road wheel 2 of this embodiment is given as a combination of the rotation axes of the outer sleeves 25 joined into an annular form, and the rotation of the driven road wheel 2 around the cross sectional center line (C) is effected by the rotation of each outer sleeve 25 around itself.

The driven road wheel 2 of the illustrated embodiment is enabled to apply a lateral traction to the ground surface by turning the outer sleeve 25 around the annular shaft member 22 (around the cross sectional center (C)) by means of the contact between the outer sleeve 25 and the free rollers 3R and 3L that rotate with the rotary members 4R and 4L, and a fore-and-aft traction to the ground surface by rotating the entire driven road wheel 2 along the outer periphery thereof.

FIG. 13 shows yet another embodiment of the vehicle 1 of the present invention. In FIG. 13, the parts corresponding to those shown in FIG. 3 are denoted with like numerals without repeating the description of such parts.

In this embodiment, a side disk 142 is attached to each rotary members 7R, 7L of the vehicle body 7 in a coaxial relationship.

An electric motor 124 is attached to the left leg member 7L of the vehicle body 7, and a pulley (or sprocket) 130 is coaxially attached to the corresponding side disk 142. The electric motor 124 is in a power transmitting relationship to the pulley 130 via a belt (or link chain) 132 so as to rotatively drive the side disk 142.

Another electric motor 125 is attached to the right leg member 7R of the vehicle body 7, and a pulley (or sprocket) 131 is coaxially attached to the corresponding side disk 143. The electric motor 125 is in a power transmitting relationship to the pulley 131 via a belt (or link chain) 133 so as to rotatively drive the side disk 143.

One of the side disks 142 supports a driven road wheel 2 similar to the driven road wheel 2 illustrated in FIG. 12 via a plurality of arms 145 extending from a tapered outer peripheral surface toward the other side disk 143.

In the illustrated embodiment, an annular shaft member 22 is supported by the side disk 145 via the arms 145, Similarly as in the embodiment illustrated in FIG. 12, a plurality of inner sleeves (not shown in the drawings) are fitted on the annular shaft member 22 so as to be immobile both circumferentially and rotatively with respect to the annular shaft member 22, and an outer sleeve 25 integrally fitted with a metal bearing (not shown in the drawings) is rotatably fitted on each inner sleeve.

The outer sleeves 25 are free rollers that engage an object to be actuated, and fitted on the annular shaft member 22, like so many beads of a rosary, so as to be rotatable around the corresponding tangential line (or around the cross sectional center line (C)).

The surface of the side disk 143 facing the other side disk 142 (leftward as seen in FIG. 13) supports a plurality of free rollers 150 each via a bracket 151 regularly along the circumference of the side disk 143. The free rollers 150 engage the circumferential side surface of the outer sleeve 25 in a torque transmitting relationship, and are each supported so as to be rotatable around a rotation axis which is in a relation of skew lines with respect to the rotation axis of the corresponding first free roller 25. In other words, the rotation axis of the outer sleeve 25 and the rotation axis of the corresponding free roller 150 are skew lines relative to each other.

More specifically, the rotation axis of each free roller 150 is tilted with respect to the rotation axis of the corresponding outer sleeve 25 on a projected plane perpendicular to the central axial line (A). The rotation axis of each free roller 150 is not only tilted with respect to the radial line of the annular shaft member 22 (corresponding to the central axial line of the outer sleeves 25) by a prescribed angle but also tilted with respect to an imaginary plane tangential to the corresponding point of the cross sectional center line of the annular shaft member 22 also by a prescribed angle. This three dimensional slanting of the axial lines is similar to the slanting in the tooth configuration of a skew bevel gear on a conical plane of a certain cone angle.

By thus tilting the support shafts 152 of the free rollers 150, when the side disks 142 and 143 are rotated relative to each other, at the contact point of each free roller 150 with the corresponding outer sleeve 25, a frictional force around the rotation axis of the outer sleeve 25 and a frictional force in the tangential direction are produced. In this embodiment, the (numerical) relationship between the outer sleeves 25 and free rollers 150 are such that each outer sleeve 25 engaging the ground surface is in contact with at least one of the free rollers 150 at all times, and receives a rotative force without being idly rotatable.

Owing to such a structure, when one of the side disks 142 is kept stationary and only the other side disk 143 is rotated, the force in the tangential direction owing to the rotation of the other side disk 143 provides a component of force that turns the outer sleeve 25 (to which the corresponding free roller 150 is in contact) around the cross sectional center line thereof. Thereby, a drive force in parallel with the central axial line of the two side disks 142 and 143 (a lateral direction as seen in FIG. 13) is applied to an object to be actuated by the outer sleeve 25.

When the two side disks 142 and 143 are rotated in a same direction at a same speed, as the outer sleeves 25 engaged by the free rollers 150 do not receive any rotative force around the cross sectional center line, the rotative drive forces of the two side disks 142 and 143 are applied to the contact surface between the outer sleeves 25 and an object to be actuated.

In this manner, by individually controlling the rotating speed and rotating direction of each side disk 142, 143, the outer sleeves 25 supported by the one side disk 142 can be given with a traction force in any two dimensional direction.

FIGS. 14 (A) and 14(B) illustrate yet another embodiment of the vehicle 1 of the present invention. In this embodiment, a pair of arms 36R and 36L are pivotally supported by a right and left step 32R and 32L, respectively, via corresponding pivot shafts 362R and 362L. Each arm 36R, 36L extends obliquely outward and downward from the corresponding step 32R, 32L, and carries a secondary wheel 35R, 35L at a free (or lower) end thereof. The central axial line of each secondary wheel 35R, 35L is in parallel with the central axial line (B) of the driven road wheel 2. Each secondary wheel 35R, 35L may consist of a caster wheel that can turn freely around a vertical axial line.

Each arm 36R, 36L may be biased by a spring (not shown in the drawing) in a direction to urge the corresponding secondary wheel 35R, 35L towards the ground surface. In other words, as seen in FIG. 14, the left arm 36L is biased in clockwise direction and the right arm 36R is biased in counter clockwise direction.

The lower surface of each step 32R, 32L is fitted with a brake shoe 38R, 38L configured to engage the outer periphery of the corresponding secondary wheel 35R, 35L.

In this embodiment, a rider places his or her feet on the corresponding steps 32R and 32L, and holds the handle bar 34 with his or her hands. When the rider tilts the vehicle body 7 in either lateral direction, the secondary wheel 35R or 35L of the corresponding side contacts the corresponding brake shoe 38R or 38L, and the corresponding secondary wheel 35R or 35L is braked. In FIG. 14(B), the right secondary wheel 35R has come to contact the brake shoe 38R, and the right secondary wheel 35R is braked.

Therefore, when one of the secondary wheels 35R or 35L is braked while the driven road wheel 2 is given with a fore-and-aft traction, the braked secondary wheel 35R or 35L is subjected to a fore-and-aft frictional force, and this causes the vehicle to change direction around the braked secondary wheel 35R or 35L. When the vehicle is desired to move laterally or obliquely, the secondary wheels 35L and 35R may be raised as was the case with the previous embodiments.

In a possible alternate arrangement, a brake shoe 38R, 38L is provided on each step 32R, 32L in a vertically moveable manner, and the handle bar 34 is provided with a pair of grip levers connected to the corresponding brake shoes 38R, 38L, respectively, via Bowden cables or the like for individually lowering the brake shoe 38R, 38L onto the secondary wheels 38R, 38L so that the engaged secondary wheel may be braked.

The driven road wheel 2 was exposed in the illustrated embodiments, but may also be covered with a cover member. In this case, the steps 32R and 32L may be fixed attached to such a cover member.

In the vehicle 1 based on a certain aspect of the present invention, multi-axis load sensors are provided in the handle bar 34, and a fore-and-aft and lateral tilt angle sensor are provided on the vehicle body. Rotational speed sensors are provided on the rotary members 4R and 4L or side disks 142 and 143. The output signals of these sensors forwarded to an electronic control unit so that the attitude control of the vehicle body may be performed. For instance, the vehicle body may be maintained in an upright position, and the tilt angle of the vehicle body may be controlled within a prescribed limit by controlling the rotational directions and rotational speeds of the rotary members 4R and 4L or side disks 142 and 143, and applying a forward, rearward, leftward or rightward drive force to the driven road wheel 2.

Also, it may be arranged such that the mode of movement may be decided by the intention of the rider according to the way the weight of the driver is distributed to the right and left steps 32R and 32L and the driver applies a force to the handle bar, as determined by a computer program.

Thus, the vehicle of the present invention is able to make small turns by producing a frictional force at the ground contact point of the secondary wheel 35, 35R, 35L and thereby creating a yaw moment around a yaw axis defined at the ground contact point of the driven road wheel 2.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application are incorporated in this application by reference.

Figure 1:
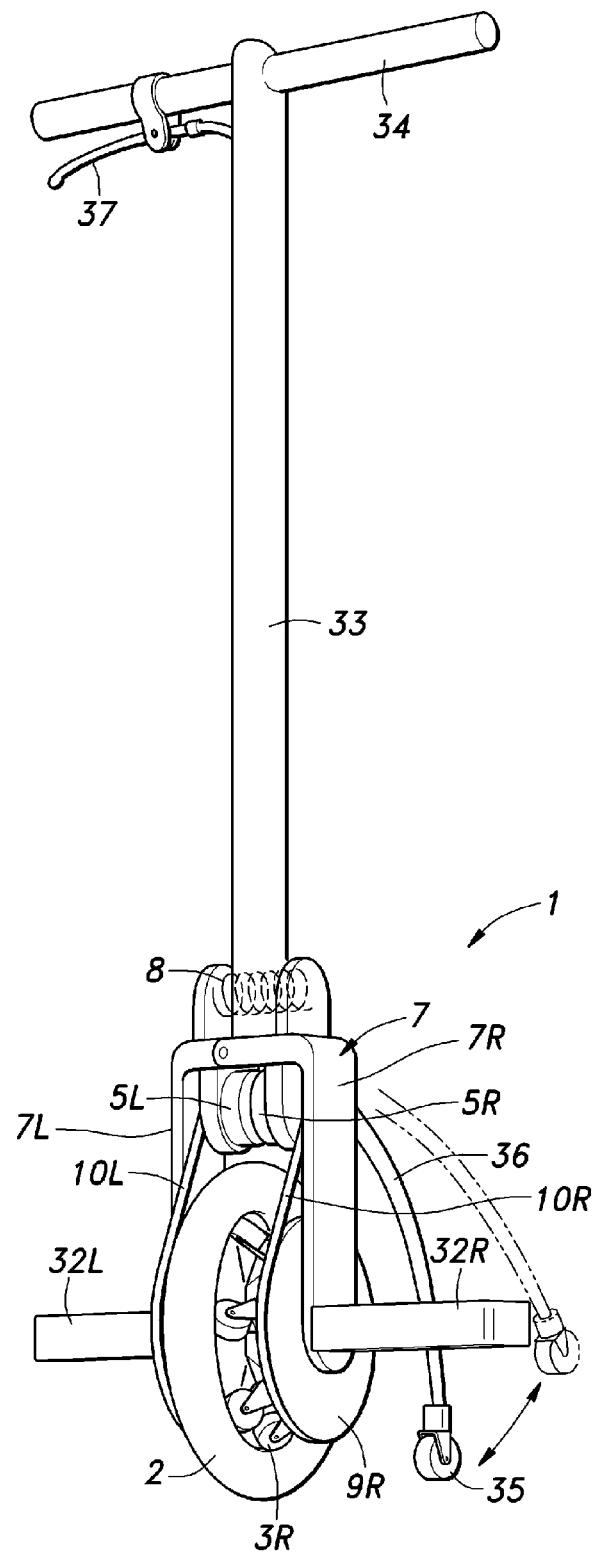
FIG. 1 is a perspective view of a first embodiment of the vehicle of the present invention.
Figure 2:
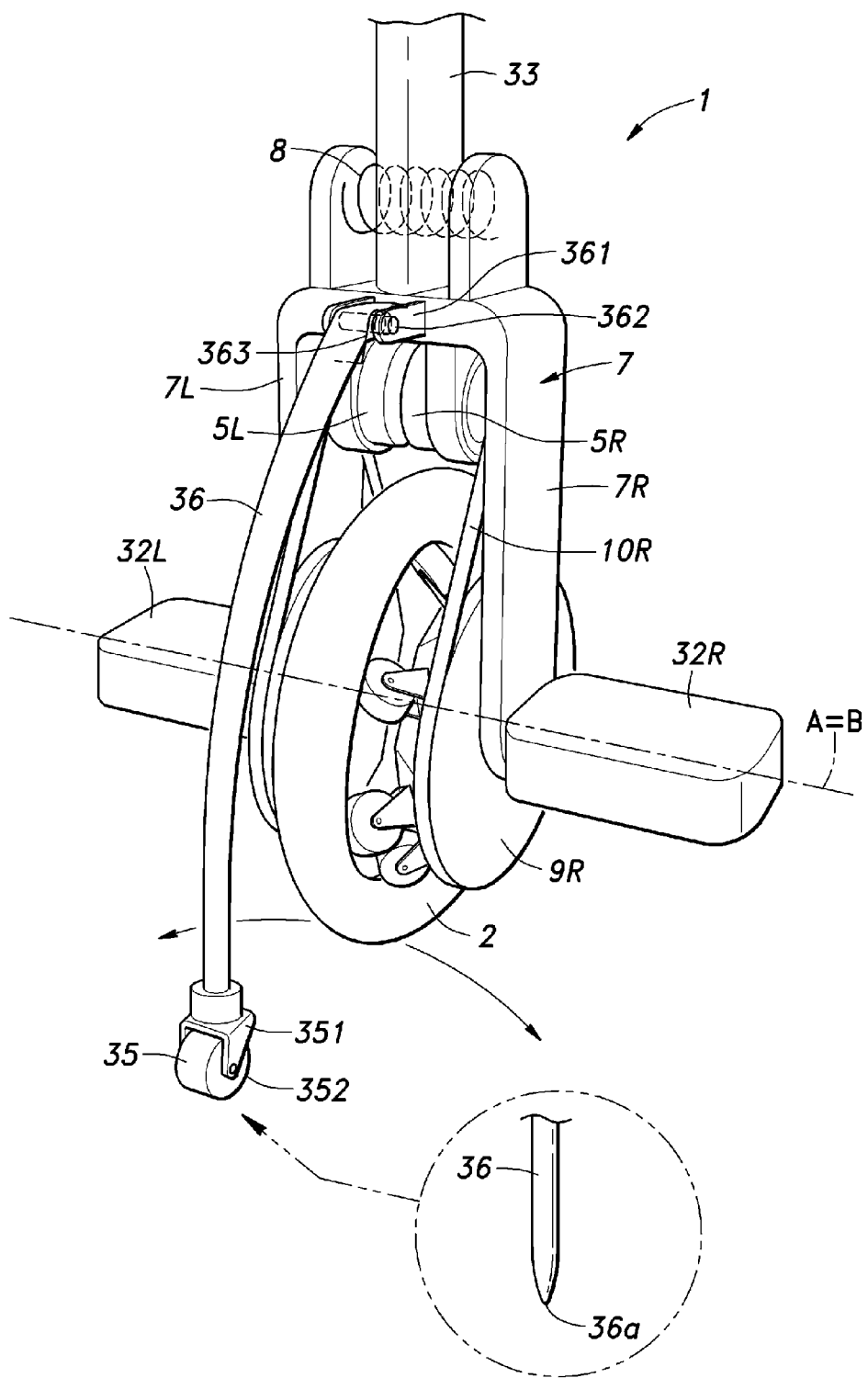
FIG. 2 is an enlarged, fragmentary perspective view of the first embodiment of the present invention.
Figure 3:
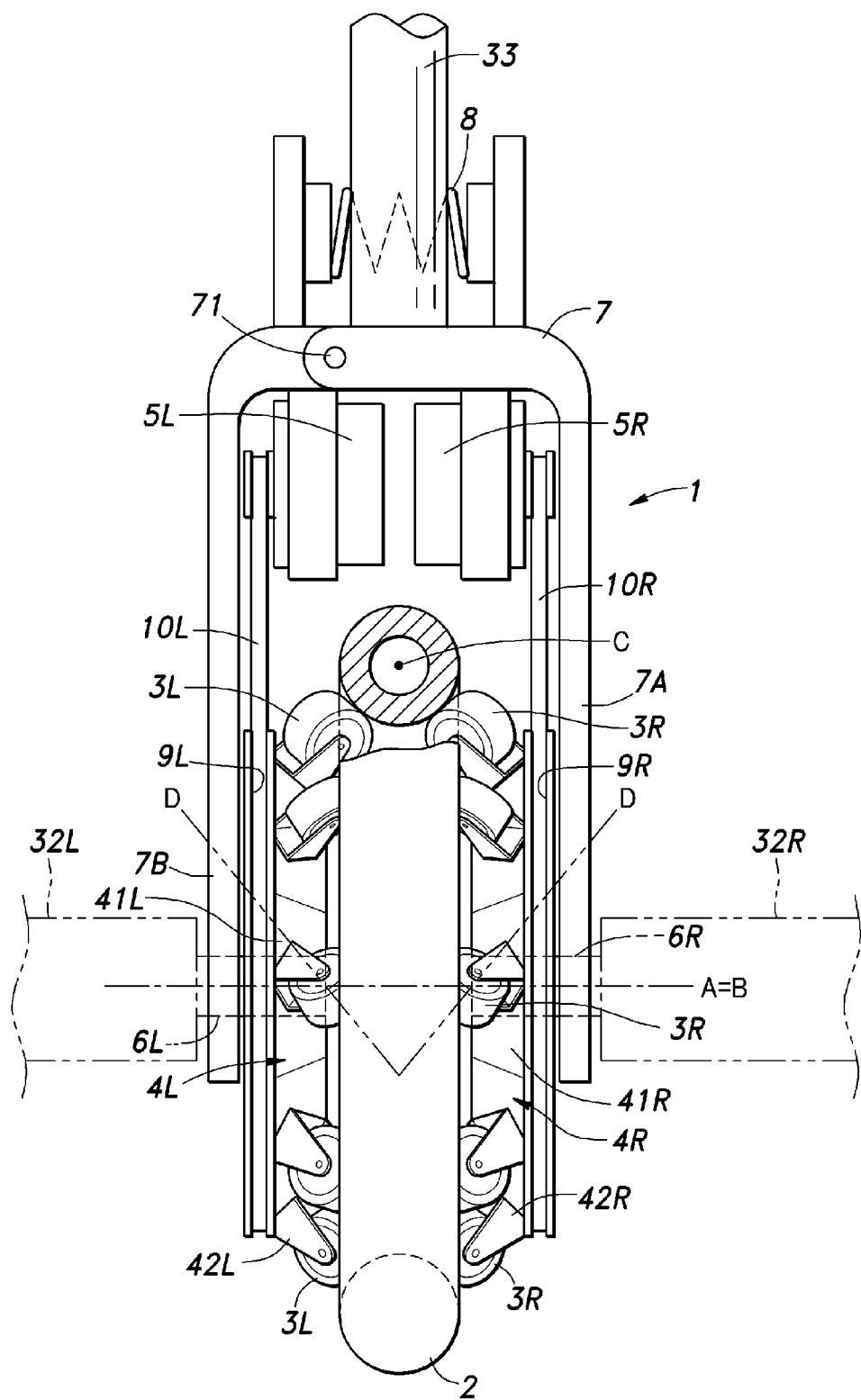
FIG. 3 is a fragmentary front view of the first embodiment of the present invention.
Figure 4:
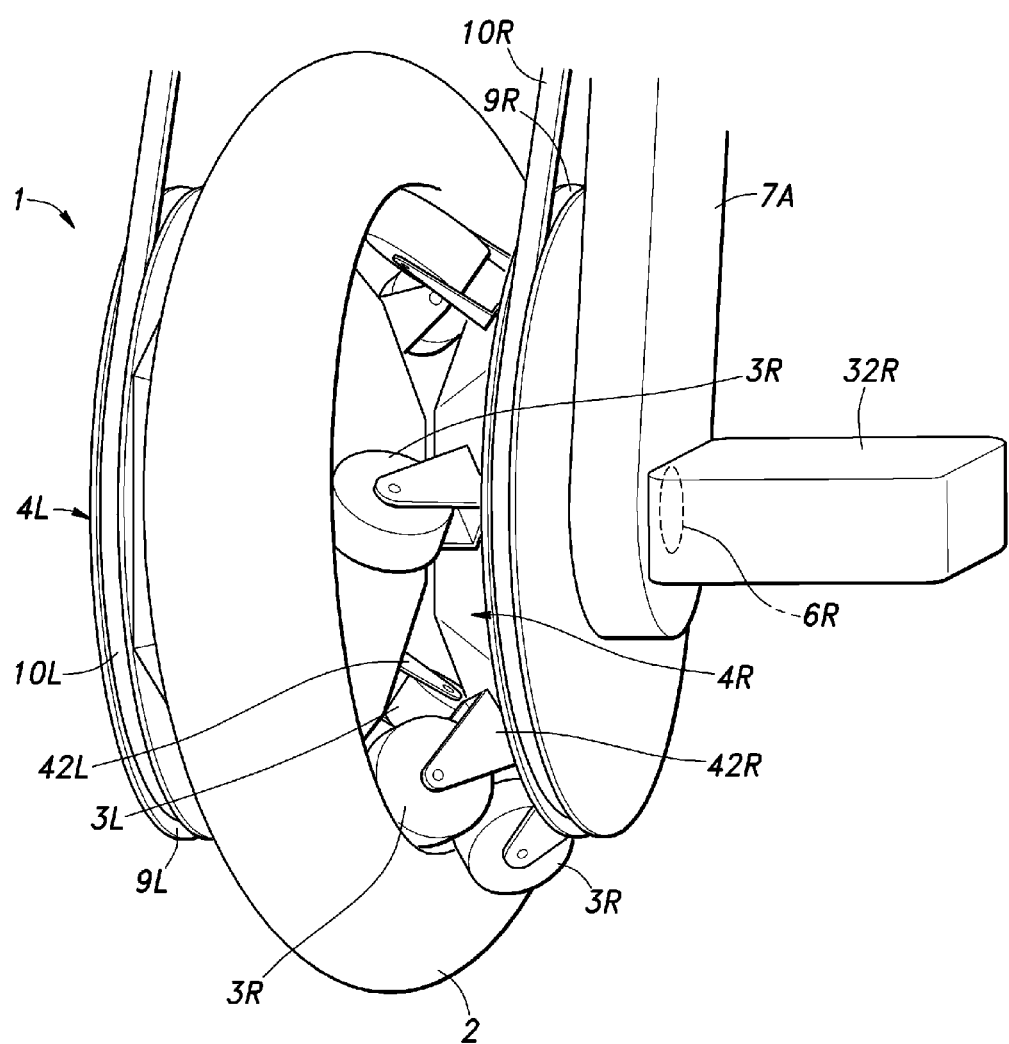
FIG. 4 is an enlarged, fragmentary perspective view of the driven road wheel of the first embodiment.
Figure 5:
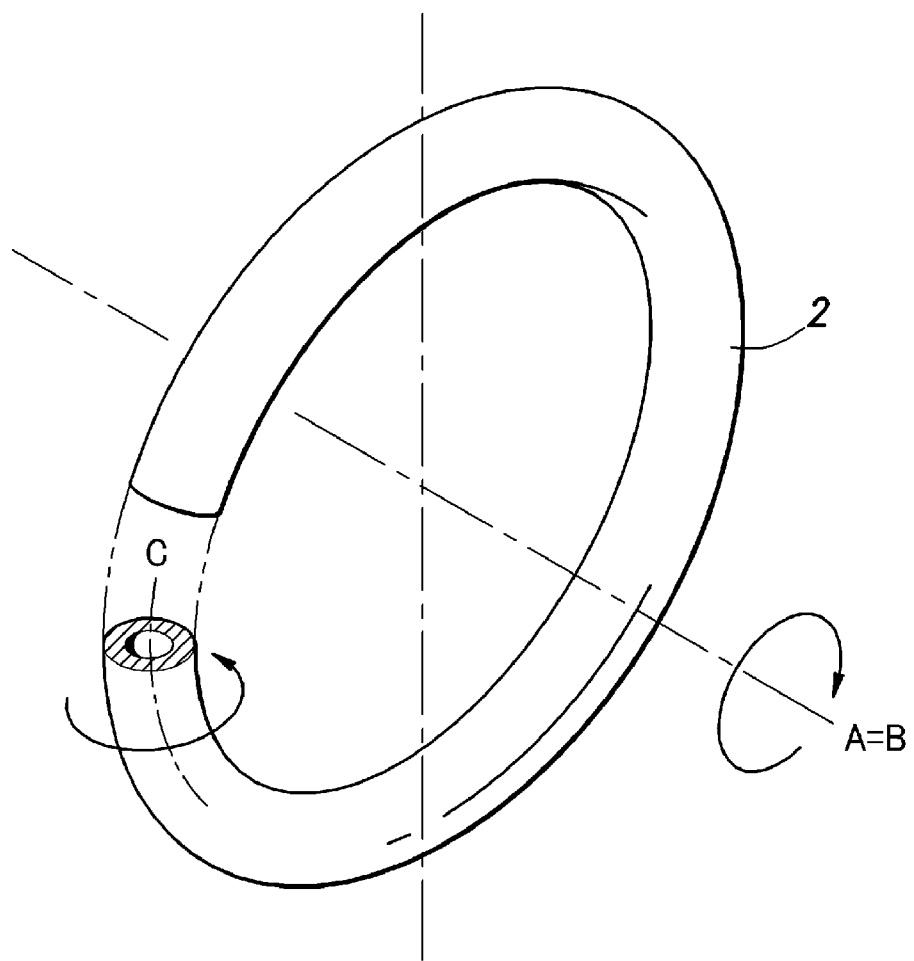
FIG. 5 is a perspective view of the driven road wheel of the first embodiment.
Figure 6:
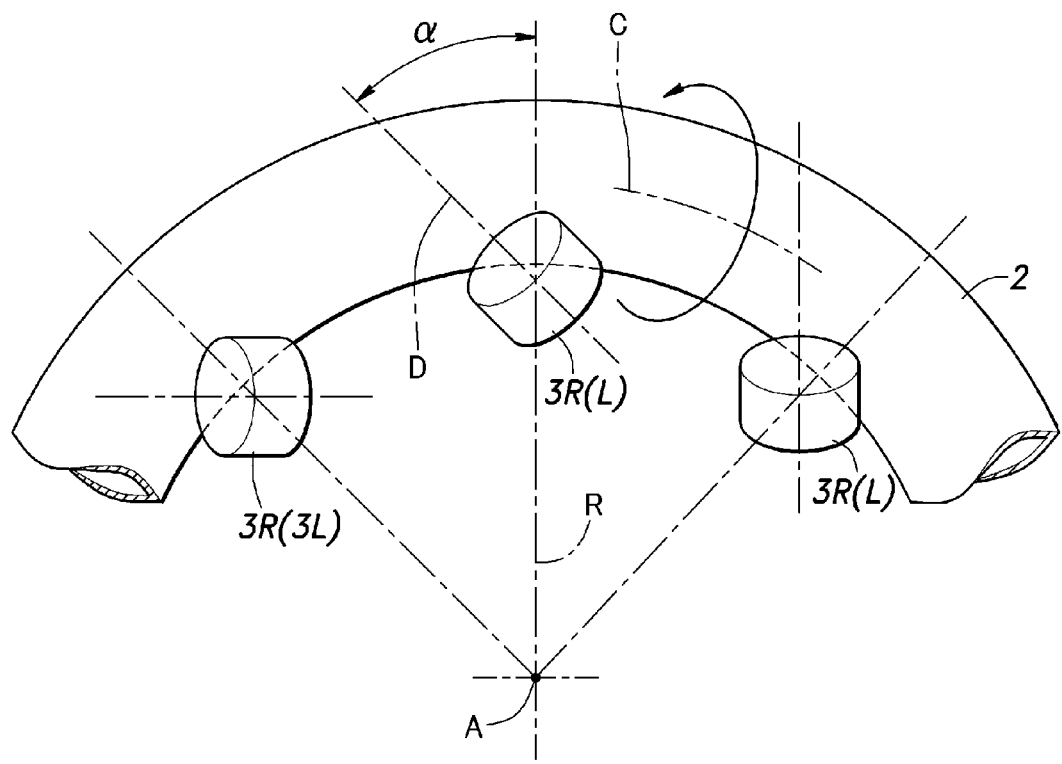
FIG. 6 is a diagram showing the relationship between the main wheel and free rollers as seen from the direction of the symmetry axis.
Figure 7:
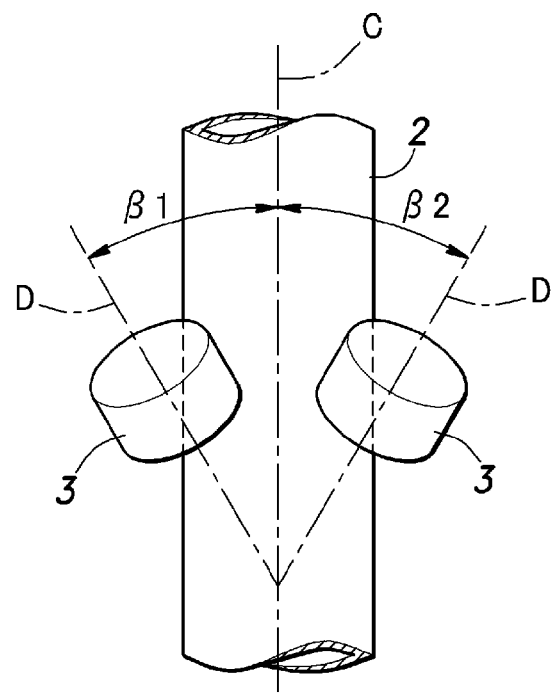
FIG. 7 is a diagram showing the relationship between the main wheel and free rollers as seen radially from the center of the main wheel.
Figure 8:
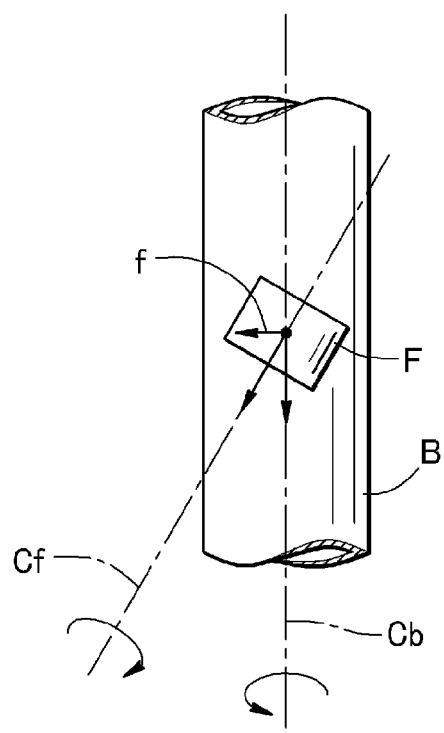
FIG. 8 is a diagram showing the working principle of the present invention.
Figure 9:
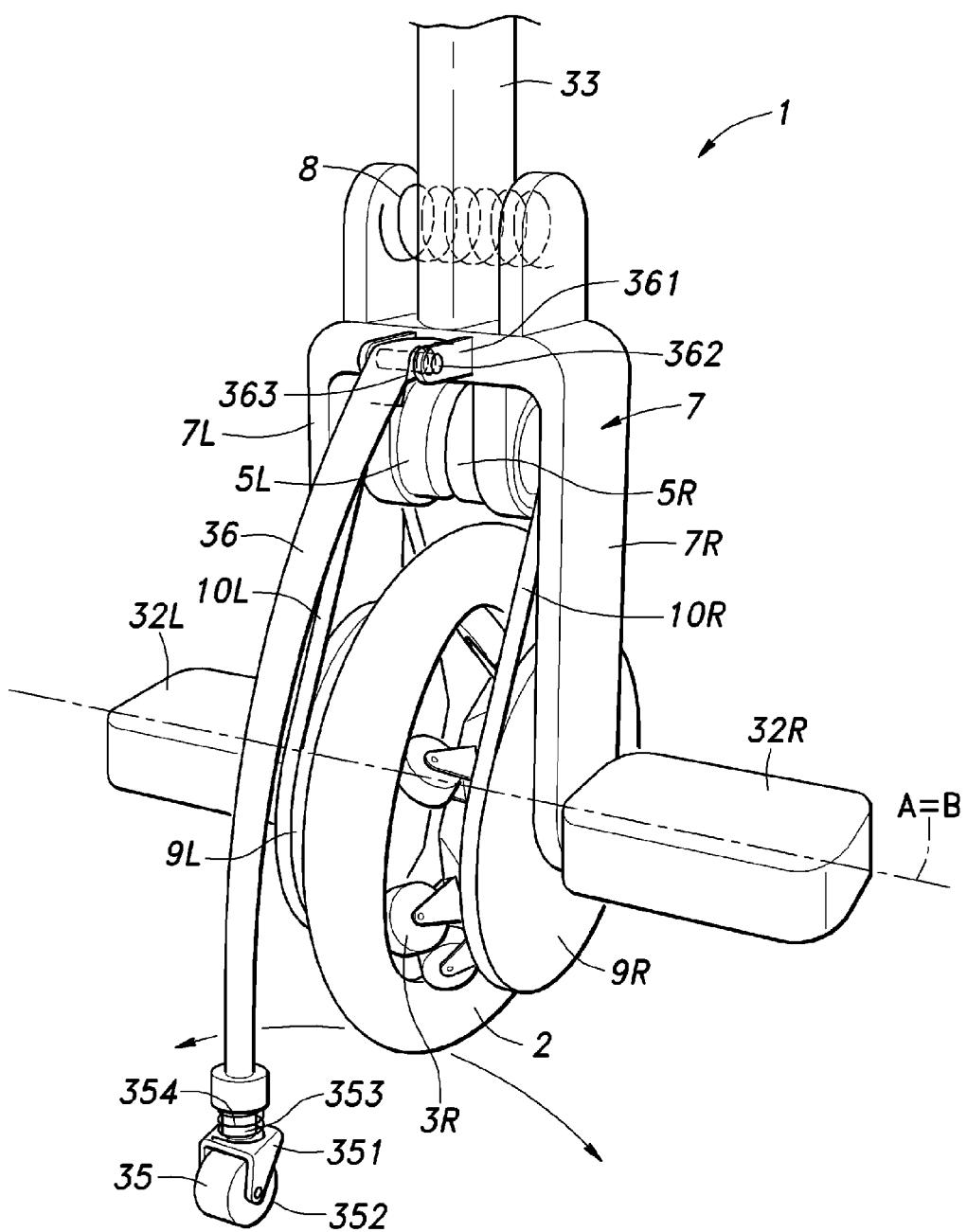
FIG. 9 is a perspective view of a modified embodiment of the present invention.
Figure 10A:
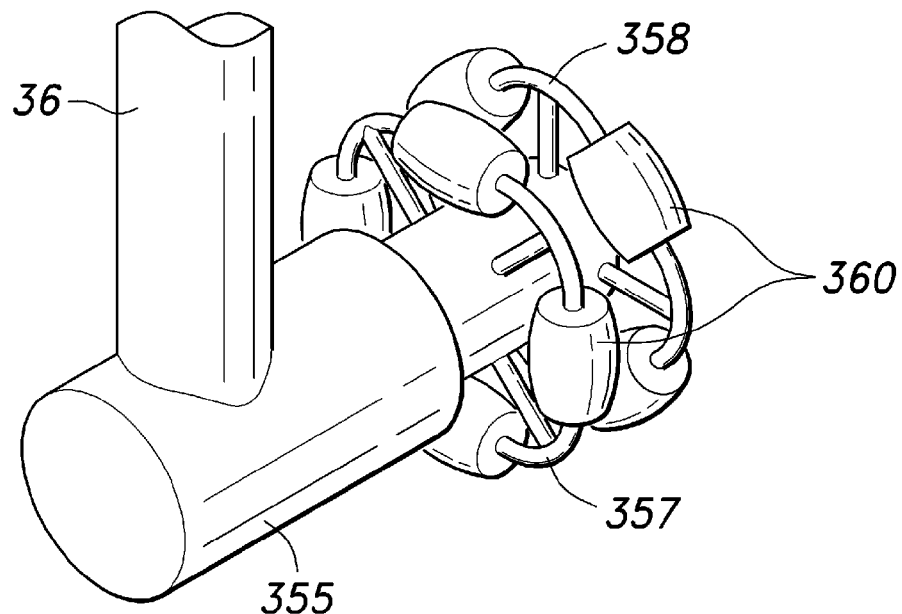
FIG. 10A is a fragmentary perspective view showing another modified embodiment of the present invention.
Figure 10B:
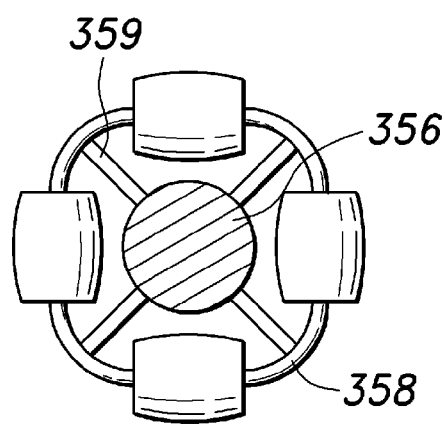
FIG. 10B is a cross sectional view of the other modified embodiment of the present invention.
Figure 11:
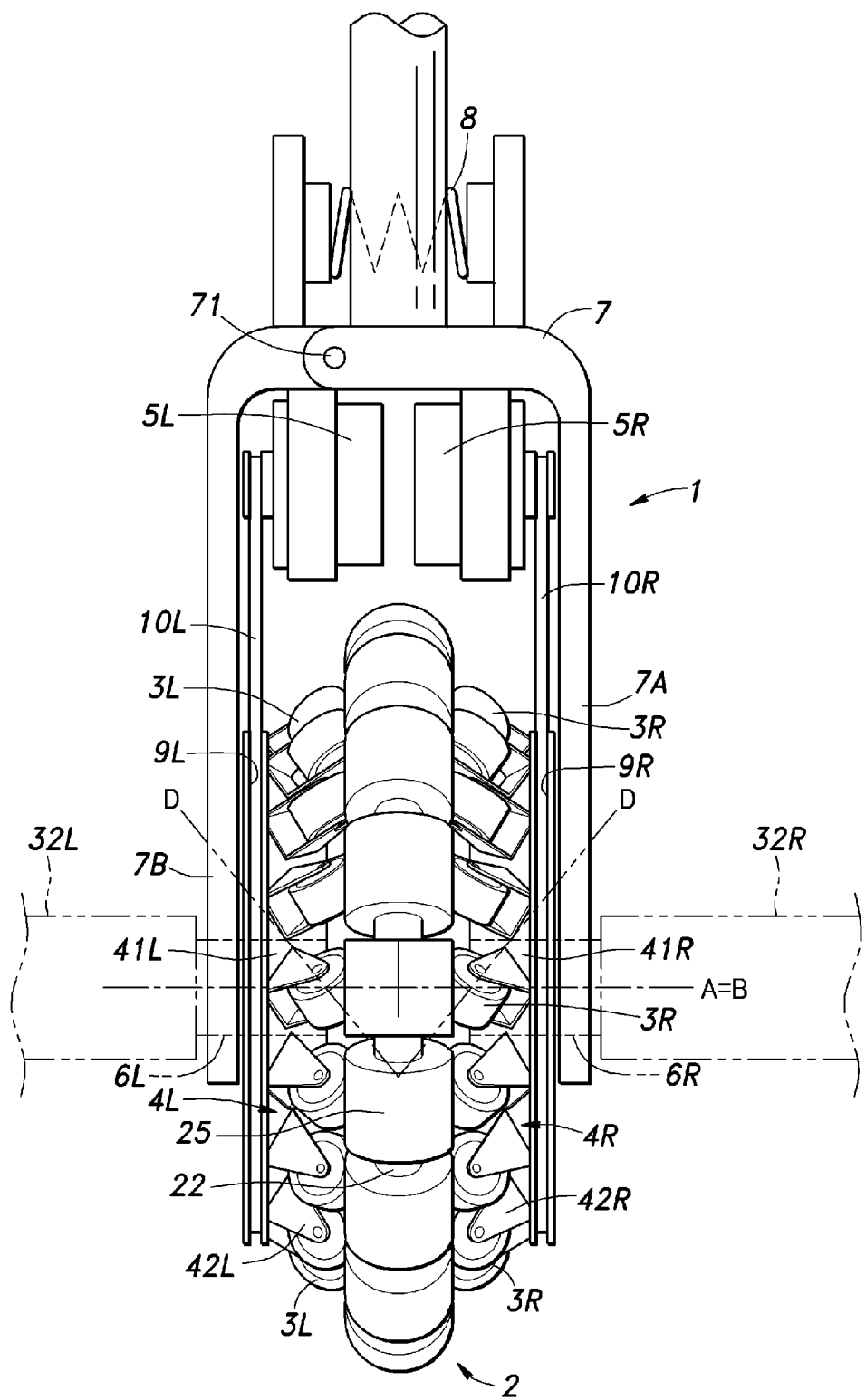
FIG. 11 is a front view of another embodiment of the vehicle of the present invention.
Figure 12:
FIG. 12 is a sectional view showing the driven road wheel of the other embodiment.
Figure 13:
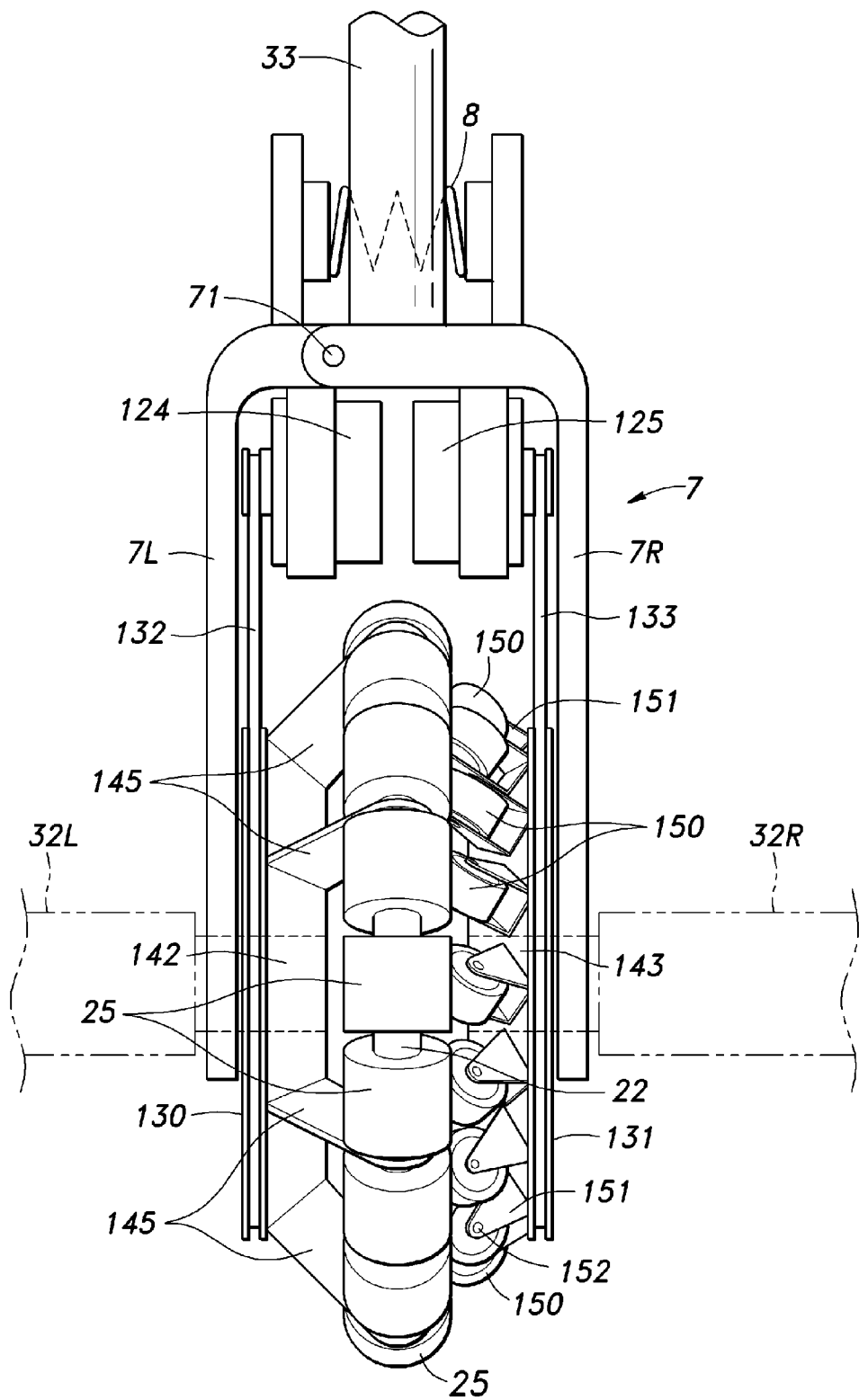
FIG. 13 is a front view of yet another embodiment of the vehicle of the present invention.
Figure 14:
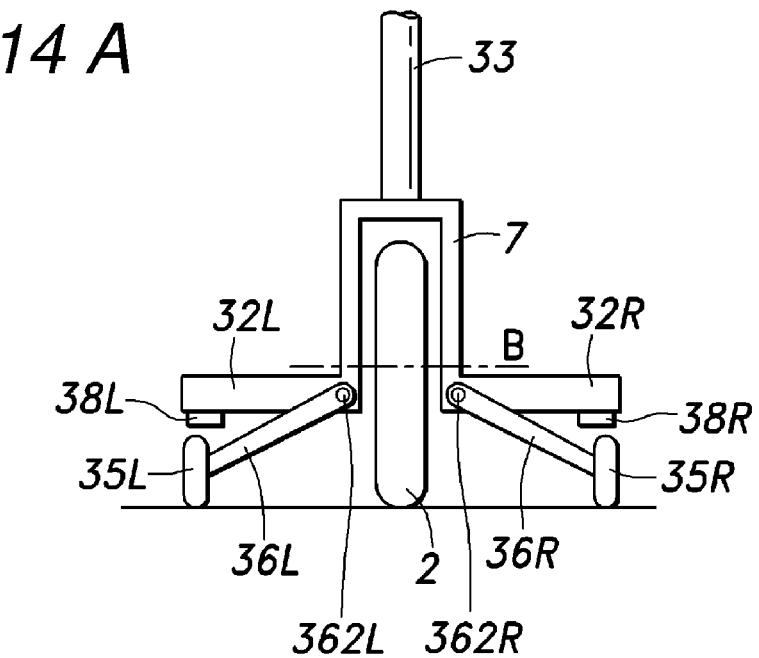
FIGS. 14A and 14B are diagrams showing the mode of operation of the yet other embodiment of the present invention.
Figure 14:
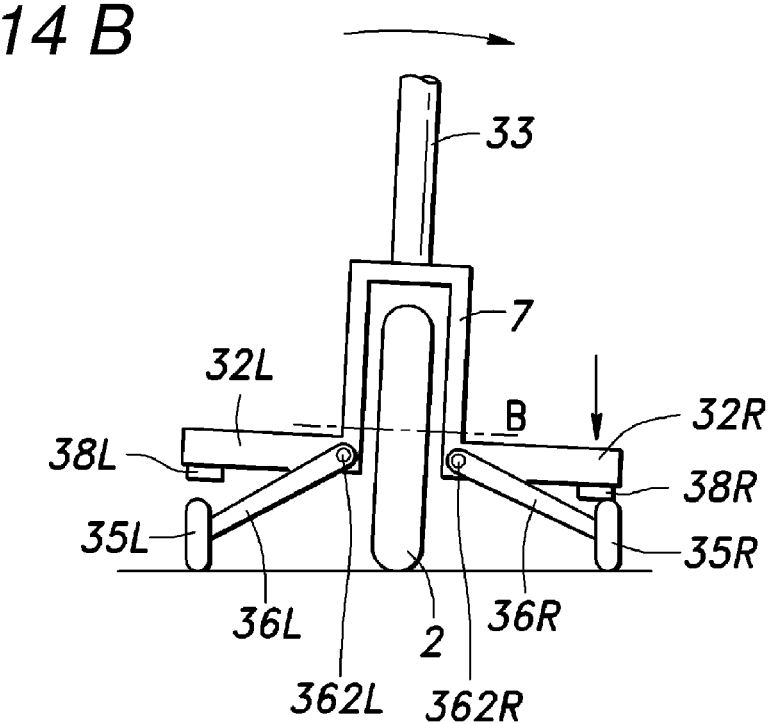

LIST OF NUMERALS 1 vehicle
7 vehicle body
2 driven road wheel
5R, 5L electric motor
35, 35R, 35L secondary wheel
36, 36R, 36L arm

The invention claimed is:

1. A vehicle, comprising:
a vehicle body;
an annular driven road wheel having a circular cross section and adapted to engage a road or floor surface at a ground contact point;
a drive assembly for driving the driven road wheel; and
a ground contact member provided on the vehicle body and configured to contact the road or floor surface;
wherein the driven road wheel is rotatable around a central axial line (B) thereof and around an annular cross sectional center line (C) passing through a center of the circular cross section thereof in such a manner that the vehicle is enabled to travel in a fore-and-aft direction as the driven road wheel is driven around the central axial line (B) thereof and in a lateral direction as the driven road wheel is driven around the annular cross sectional center line (C).

2. The vehicle according to claim 1, wherein the ground contact member is configured to selectively engage the road or floor surface.

3. The vehicle according to claim 1, wherein the ground contact member is provided behind the driven road wheel with respect to a fore-and-aft direction.

4. The vehicle according to claim 1, wherein the ground contact member is one of a pair of ground contact members provided on either lateral side of the driven road wheel.

5. The vehicle according to claim 1, wherein the ground contact member comprises a non-rotatable member.

6. The vehicle according to claim 1, wherein the ground contact member comprises a secondary wheel rotatable around an axial line in parallel with the central axial line of the driven road wheel.

7. The vehicle according to claim 1, wherein the ground contact member comprises an omni-directional-wheel that can roll circumferentially along a circle centered around the ground contact point of the driven road wheel, and can idly roll in a traveling direction of the driven road wheel, the vehicle further comprising a drive unit for rotatively actuating the omni-directional-wheel.

8. The vehicle according to claim 1, wherein the ground contact member comprises a secondary wheel rotatable around a horizontal axial line and a vertical axial line.

9. The vehicle according to claim 8, wherein the secondary wheel is resiliently urged by a biasing means such that the horizontal axial line is directed in parallel with the central axial line (B) of the driven road wheel.

10. The vehicle according to claim 1, wherein the drive assembly comprises a pair of rotary members provided on a vehicle body axially spaced from each other and rotatable around the central axial line (B), a drive unit mounted on the vehicle body and configured to individually actuate the two rotary members and a plurality of free rollers mounted along a periphery of each rotary member; and the driven road wheel is rotatably supported by being interposed between the rotary members from either axial direction via the free rollers so as to be rotatable around the central axial line (B), each free roller of at least one of the rotary members being disposed so as to be rotatable around a respective roller axial line (D) related to the central axial line (B) of the driven road wheel as skew lines and engaging an outer surface of the driven road wheel.

11. The vehicle according to claim 1, wherein the driven road wheel comprises a flexible, endless tubular member.

12. The vehicle according to claim 1, wherein the driven road wheel comprises an annular member and a plurality of discrete sleeves rotatably fitted on the annular member.

13. The vehicle according to claim 1, wherein the drive assembly comprises a rotary member disposed so as to be rotatable around an axial center line coincident to the center axial line of the annular driven road wheel, a drive unit configured to actuate the rotary member and a plurality of free rollers mounted along a periphery of the rotary member; and the driven road wheel opposes the rotary member from an axial direction via the free rollers, each free roller being disposed so as to be rotatable around a respective roller axial line (D) related to a central axial line (B) of the driven road wheel as skew lines and engaging an outer surface of the driven road wheel.

14. The vehicle according to claim 1, wherein the ground contact member comprises a pair of secondary wheels configured to contact a ground surface on either laterally spaced point of the driven road wheel and having a rotational axis extending in parallel with that of the driven road wheel, and each secondary wheel is provided with an individually operable brake.

15. An omni-directional vehicle, comprising:

a base;

a first moveable member and a second moveable member each moveably supported by the base;

a first drive unit and a second drive unit for actuating the first moveable member and second moveable member, respectively;

a plurality of first free rollers arranged on the first moveable member along a direction of movement thereof, and each having a rotational axis extending at a first angle with respect to the direction of movement thereof; and a plurality of second free rollers arranged on the second moveable member along a direction of movement thereof, and so as to be in a rolling contact with the corresponding first free rollers as at least one of the first and second moveable members moves along the direction of movement thereof with respect to the other, each second free roller having a rotational axis defining a second angle different from the first angle with respect to the direction of movement thereof;

wherein the first free rollers are configured to engage a road or floor surface, and the vehicle further comprises a ground contact member configure to contact a ground surface at a point displaced from a ground contact point of the corresponding first free roller.

* * * * *